United States Patent [19]

Stees

[11] Patent Number: 4,663,988
[45] Date of Patent: May 12, 1987

[54] LOCKING DIFFERENTIAL

[76] Inventor: Joseph H. Stees, 2156 W. Galena Ave., Freeport, Ill. 60132

[21] Appl. No.: 784,236

[22] Filed: Oct. 4, 1985

[51] Int. Cl.[4] .............................................. F16H 1/44
[52] U.S. Cl. ...................................................... 74/711
[58] Field of Search .............................. 74/710.5, 711

[56] References Cited

U.S. PATENT DOCUMENTS

| | | |
|---|---|---|
| 2,501,956 | 3/1950 | Misener ............................ 74/710.5 |
| 3,131,579 | 5/1964 | Elliott .............................. 74/710.5 |
| 3,403,582 | 10/1968 | Morden .................................. 74/711 |
| 3,686,976 | 8/1972 | Philippi ................................. 74/711 |
| 3,724,289 | 4/1973 | Kennicatt ............................. 74/711 |
| 3,985,045 | 10/1976 | Shilling et al. ....................... 74/711 |
| 4,258,588 | 3/1981 | Yum ................................... 74/711 X |

FOREIGN PATENT DOCUMENTS 1155889  6/1969  United Kingdom .................. 74/711

Primary Examiner—Leslie Braun
Assistant Examiner—Dwight G. Diehl
Attorney, Agent, or Firm—Harvey B. Jacobson

[57] ABSTRACT

A differential gear assembly is provided including relatively rotatable opposing axle gears and a differential gear meshed with the axle gears. Friction brake structure is provided responsive to (1) angular velocity of the differential gear above a predetermined minimum and (2) sudden increase in angular velocity of the differential gear to friction brake the axle gears against rotation relative to each other.

9 Claims, 5 Drawing Figures

LOCKING DIFFERENTIAL

BACKGROUND OF THE INVENTION

1. Field of the Invention

This invention relates to a vehicle differential assembly driving a pair of driven shafts including gears thereon with which a differential gear is meshed and a friction brake assembly is provided for friction braking the driven shaft gears relative to each other responsive to rotation of the differential gear above a predetermined angular velocity.

2. Description of Related Art

Various different forms of automotive differential assemblies heretofore have been provided wherein structure is provided for limiting relative angular displacement of a pair of shafts driven from the differential assembly, or wherein the differential assembly drives a pair of shafts in a manner such that at least a major portion of the torque supplied to the differential assembly is transferred to the driven shaft having the greater resistance to rotation thereof.

However, most previously known forms of locking or limited slip differential assemblies heretofore provided utilize locking or torque transfer mechanisms which are reasonably complex, expensive to produce and require considerable maintenance. Accordingly, a need exists for an automotive differential assembly which will be capable of at least frictionally resisting excessive angular velocity of one driven shaft relative to a second driven shaft.

SUMMARY OF THE INVENTION

The locking differential of the instant invention includes structure whereby excessive angular velocity of a first driven shaft relative to a second driven shaft is frictionally resisted so as to thereby transfer a portion of the torque supplied to the first driven shaft from the first driven shaft to the second driven shaft.

The main object of this invention is to provide an automotive differential assembly which will be capable of transferring rotary torque from a first driven shaft rotating at an excess angular velocity relative to a second driven shaft to that second driven shaft.

Another object of this invention is to provide a differential assembly which may be readily retrofitted to existing vehicular applications as well as incorporated into the manufacture of various new vehicular differential assemblies.

Yet another object of this invention is to provide a differential assembly incorporating, in addition to a pair of axle gears, at least one differential gear meshed with the axle gears and a friction braking mechanism actuated by excess angular velocity of the differential gear for friction braking the axle gears relative to each other.

Another object of this invention, in accordance with the immediately preceding object, is to provide a differential assembly including a friction braking mechanism mounted entirely between the axle gears to be frictionally braked relative to each other.

A final object of this invention to be specifically enumerated herein is to provide a locking differential in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
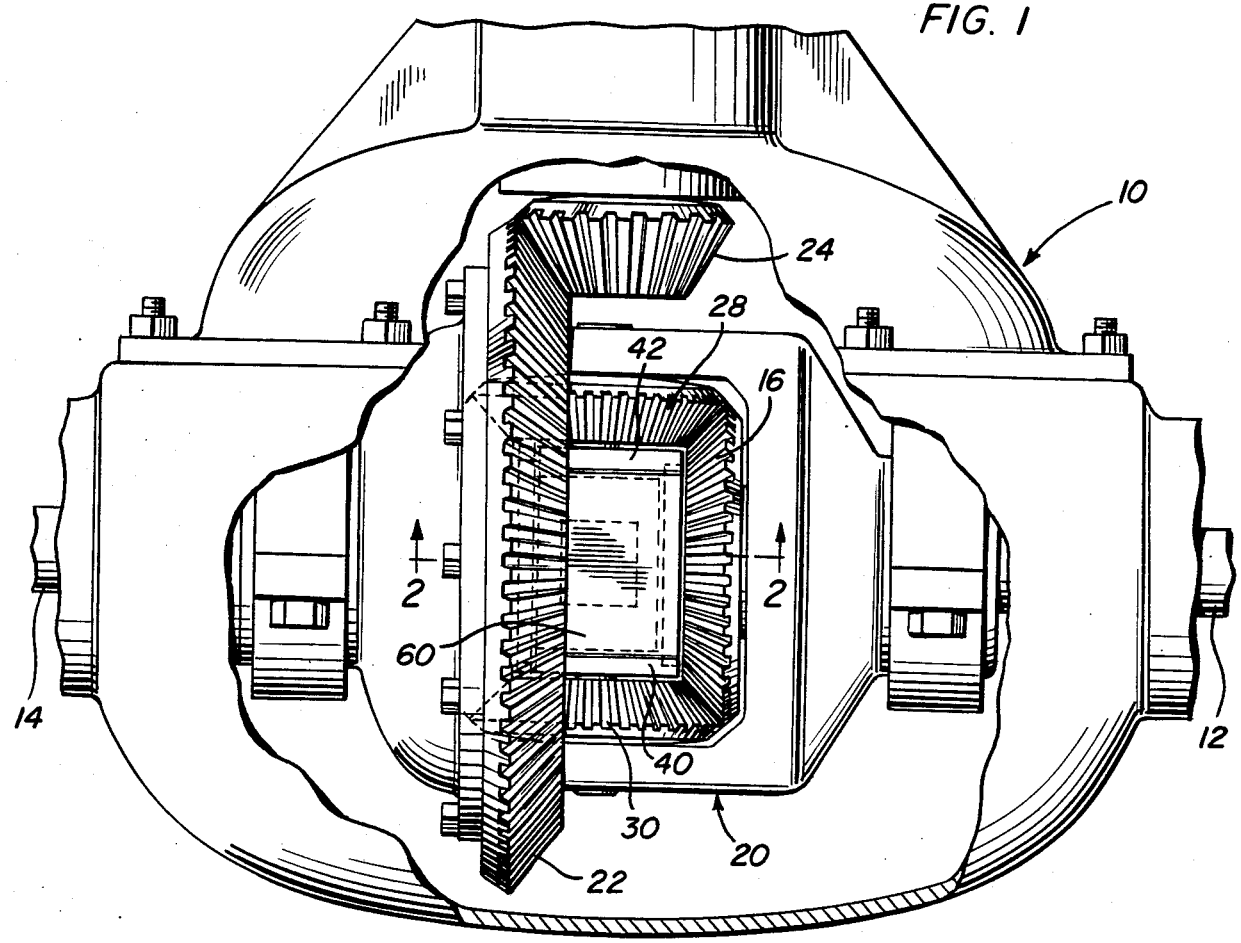
FIG. 1 is a top plan view of a vehicular drive axle assembly with a portion of the center section of the axle assembly being broken away and illustrating the differential gear assembly of the instant invention.
Figure 5:
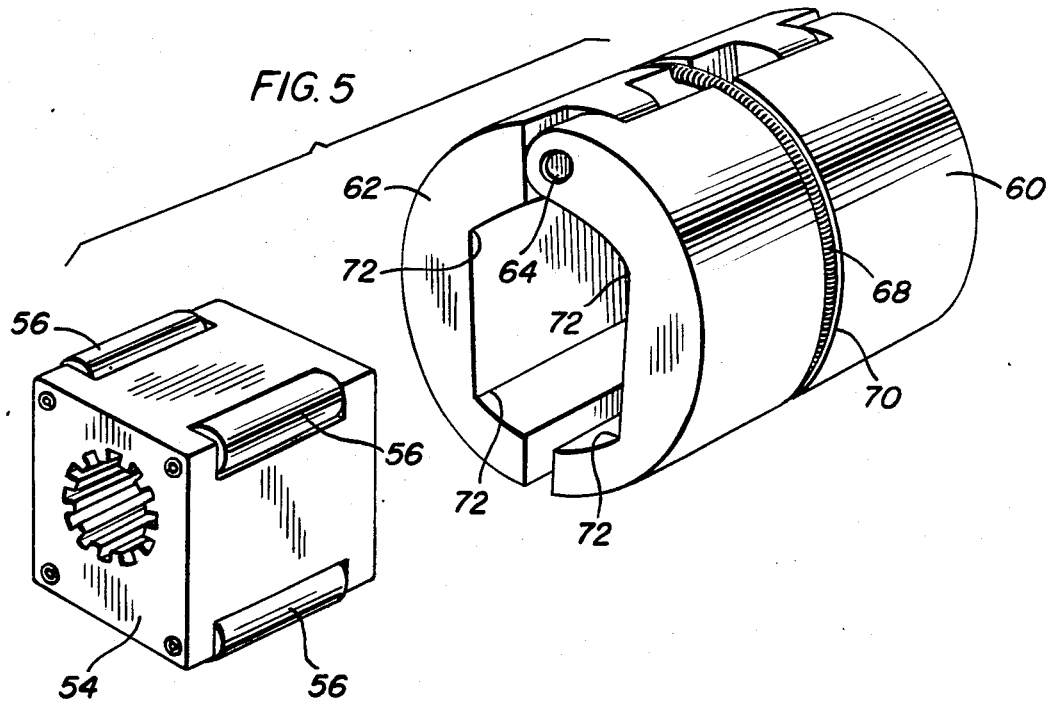
FIG. 5 is an exploded perspective view of the interior components of the friction braking mechanism.

Referring now more specifically to the drawings the numeral 10 generally designates a typical automotive drive axle assembly including a pair of opposite side driven axles 12 and 14 having axle gears 16 and 18 drivingly connected thereto. The axle assembly 10 encloses a differential gear assembly referred to in general by the reference numeral 20 including a ring gear 22 and from which the axle gears 16 and 18 are journaled. The assembly 10 includes a pinion gear 24 meshed with the ring gear 22 and the assembly 20 includes a differential gear shaft 26 journaled therefrom disposed normal to the axles 12 and 14.

First and second differential gears 28 and 30 are mounted on the shaft 26 with the gear 28 keyed to the shaft by splines 32 and the gear 30 freely rotatable relative to the shaft 26.

The differential gears 28 and 30 are meshed with the axle gears 16 and 18 and a friction brake assembly referred to in general by the reference numeral 34 is mounted on the shaft 26 between the axle gears 16 and 18 and the differential gears 28 and 30. The friction brake assembly includes and open-ended generally rectangular housing 36 including removable end walls 40 an 42 removably secured over the opposite ends of the housing 36 through the utilization of threaded fasteners 44, the end walls 40 and 42 being stepped and including sealing gaskets 46. In addition, each of the end walls includes a central opening 48 formed therethrough equipped with an interior O-ring seal 50 forming a fluid-tight seal between the shaft 26 and the end walls 40 and 42.

The longitudinal mid-portion of the shaft 26 is splined as at 52 and has a rectangular cam block 54 mounted thereon provided with four corner rollers 56. The housing 36 includes a cylindrical cavity 58 formed therethrough and a pair of generally semi-cylindrical brake shoes 60 and 62 are pivotally connected as at 64 and loosely received witthin the cavity 58, the roller-equipped cam block 54 being loosely received between the opposing inner surfaces of the shoes 60 and 62.

The shoes 60 and 62 include longitudinal mid-portion peripherally extending grooves 68 formed therein and an expansion spring 70 is seated in the grooves 68 and serves to yieldingly retract the shoes 60 and 62 to a position with the rollers 56 of the cam block 54 seated in interior corner portions 72 defined on the interiors of the shoes 60 and 62. In this manner, the spring 70 serves to maintain the pivotally interconnected shoes 62 and 60 concentric with the axis of rotation of the shaft 26.

Figure 2:
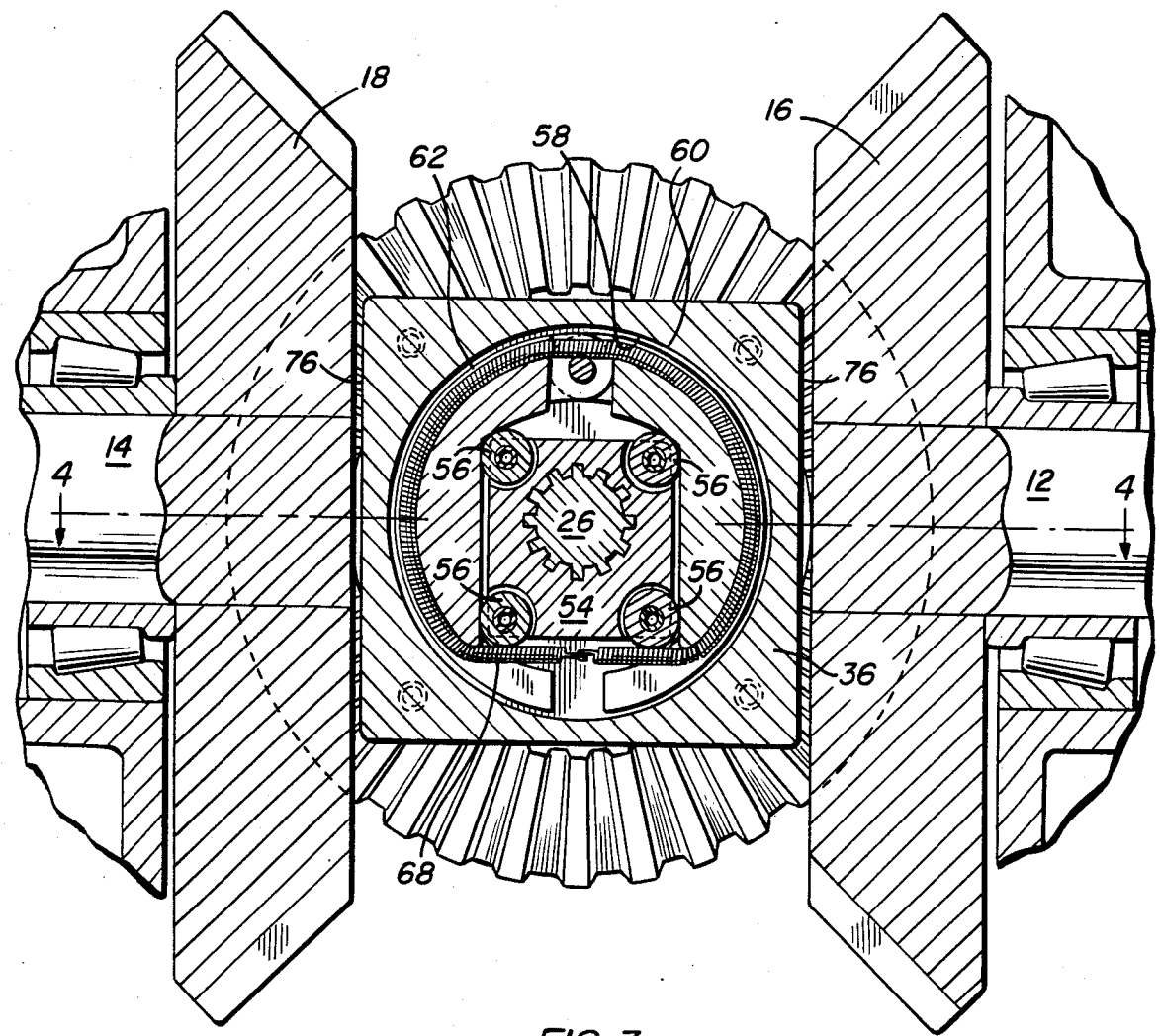
FIG. 2 is an enlarged fragmentary vertical sectional view taken substantially upon the plane indicated by the section line 2—2 of FIG. 1 and illustrating the differential assembly in a non-locking mode.

From FIG. 2 of the drawings it may be seen that remote outer sides 76 of the cam block 54 are spaced slightly from the opposing end faces of the axle gears 16 and 18 (the spacing being exaggerated in FIG. 2). Further, it may also be seen from FIG. 2 that the generally semi-cylindrical outer surfaces of the shoes 60 and 62 are spaced slightly inwardly of the opposing surface portions of the housing 36 defining the cavity 58 extending therethrough.

Figure 3:
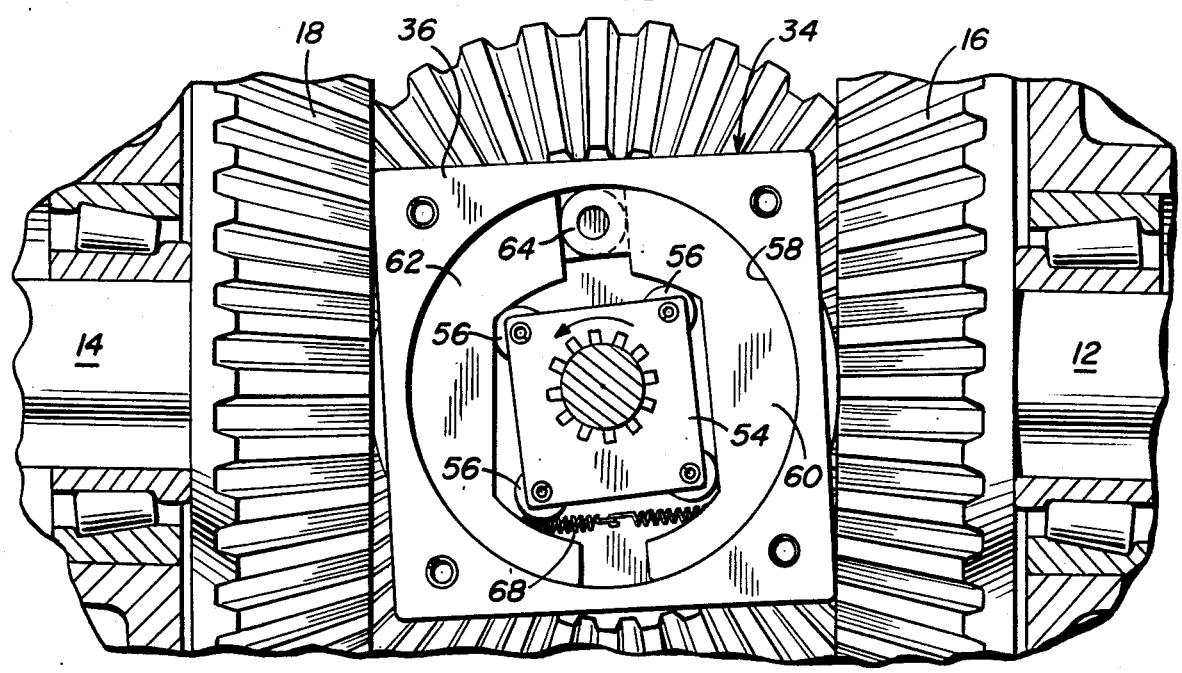
FIG. 3 is an elevational view of the assemblage illustrated in FIG. 2 with the near end plate of the centrifugally actuated friction braking assembly removed and the latter in a friction braking mode.
Figure 4:
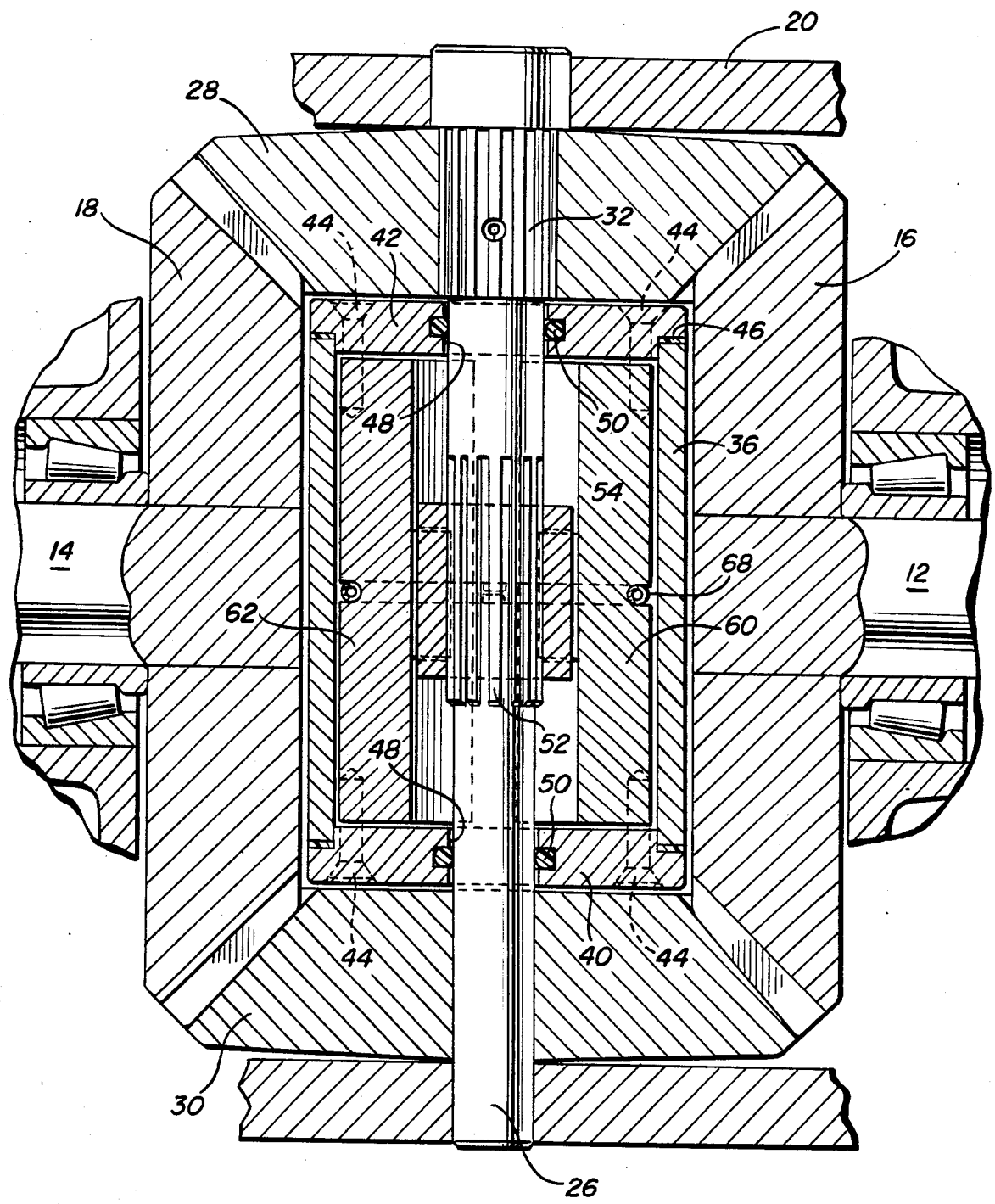
FIG. 4 is a sectional view taken substantially upon the plane indicated by the section line 4—4 of FIG. 2.

In operation, when the pinion gear 24 drives the ring gear 22 and both of the wheels (not shown) driven from the remote ends of the axles 12 and 14 turn at the same speed, the assembly 20, including the ring gear 22 rotates as a unit to drive the shafts 12 and 14. However, should the vehicle wheel (not shown) driven by the axle 12 experience a loss in frictional engagement with the supporting ground or road surface, the axle 12 may rotate at a speed faster than the speed of rotation of the axle 14 thereby causing both of the differential gears 28 and 30 to rotate, as is conventional. As soon as the angular speed of the differential gear 28 exceeds a predetermined angular speed, the ends of the shoes 60 and 62 remote from the pivot connection 64 tend to swing apart and engage the walls of the cavity 58 and the assembly comprising the pivotally connected shoes 60 and 62 experiences a drop in angular speed relative to the shaft 26 thereby enabling the cam block 54 to be angularly displaced in advance of the assembly comprising the pivotally connected shoes 60 and 62 to cause the rollers 56 to more tightly cam the shoes 60 and 62 into engagement with the surfaces of the housing 36 defining the cavity 60. This causes the housing 36 to be canted in the manner illustrated in FIG. 3 of the drawings in order to frictionally brake the axle gears 16 and 18 against rotation relative to each other, which friction braking action transfers some of the torque supplied to the shaft 12 to the shaft 14 through the gears 16 and 18 and the housing 36 frictionally engaged therewith.

Accordingly, should one of the shafts 12 and 14 be gradually angularly accelerated relative to the other shaft the housing 36 will frictionally brake the gears 16 and 18 against rotation relative to each other as the angular speed of the shaft 26 reaches a predetermined angular speed.

Furthermore, the torque transferring capacity of the instant invention also may be brought into play upon rapid acceleration of the shaft 26. As for example, if the two drive wheels (not shown) of the associated vehicle mounted upon the remote ends of the axles 12 and 14 are disposed such that one is on a slippery surface and the other is on a surface offering at least reasonably good traction, if the manual or automatic transmission (not shown) of the associated vehicle is quickly actuated to impart rotation to the pinion gear 24, the resultant rapid acceleration of the ring gear will cause the drive wheel having the least traction to initially spin thereby causing even faster acceleration of the differential gear 28 and the cam block 54 thereby causing the rollers 56 to cam the shoes 60 and 62 apart at their ends remote from the pivot connection 64 therebetween. This of course will cause the housing 36 to be quickly cocked to the position thereof illustrated in FIG. 3 and to frictionally engage and thus brake the axle gears 16 and 18 against relative rotation, as long as there is relative rotation therebetween and the torque applied to the pinion gear 24 is uninterrupted.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A differential gear assembly including a rotating differential housing from which a differential gear is journaled with the differential gear meshed with driven gears arranged on axle shafts relative to which the housing is rotatable, friction brake means including a rotatable actuator driven by and rotatable with said differential gear, said actuator including means operative to actuate said friction brake means responsive to angular velocity of said actuator above a predetermined angular velocity, said friction brake means, when actuated, being in operative association with said axle gears for friction braking the latter against rotation relative to each other.

2. The assembly of claim 1 wherein said actuator and friction brake means are disposed entirely between said axle gears.

3. The assembly of claim 1 wherein said differential housing includes a differential gear shaft journaled therefrom for rotation about an axis normal to the axis of rotation of said housing and axle gears, said differential gear and actuator being mounted on said differential gear shaft for rotation therewith.

4. The assembly of claim 3 wherein said friction brake means is mounted on said differential gear shaft for rotation of the latter relative to said friction brake means, said friction brake means including friction brake members disposed between said axle gears and shiftable toward and away from the latter, said actuator being operatively associated with said brake members to shift the latter toward friction engagement therewith responsive to rotation of said actuator above said predetermined angular velocity.

5. A differential gear assembly including a rotating differential housing which journals a differential gear meshed with driven gears arranged on axle shafts relative to which said housing is rotatable, friction brake means including a rotatable actuator driven by and rotatable with said differential gear, said actuator and friction brake means being operatively associated such that rapid angular acceleration of said actuator is operative to actuate said friction brake means, said friction brake means, when actuated, being in operative association with said axle gears for friction braking of the latter against rotation relative to each other.

6. The assembly of claim 5 wherein said friction brake means is supported, via said actuator, from said actuator for rotation with said actuator and shaft.

7. The assembly of claim 6 wherein said friction brake means also includes means for actuation thereof by centrifugal action responsive to angular velocity of said actuator above a predetermined velocity.

8. The assembly of claim 7 wherein said actuator and friction brake means are disposed entirely between said axle gears.

9. The assembly of claim 8 wherein said differential housing includes a differential gear shaft journaled therefrom for rotation about an axis normal to the axis of rotation of said housing and axle gears, said differential gear and actuator being mounted on said differential gear shaft.

* * * * *